United States Patent
Babikyan et al.

(10) Patent No.: US 11,277,521 B1
(45) Date of Patent: Mar. 15, 2022

(54) ON PREMISES GATEWAYS INTERCONNECTING VOIP SYSTEMS, THE PUBLIC SWITCHED TELEPHONE NETWORK AND PRIVATE BRANCH EXCHANGES AND OTHER TELEPHONY INFRASTRUCTURE

(71) Applicant: Dialpad, Inc., San Francisco, CA (US)

(72) Inventors: Armen Babikyan, San Francisco, CA (US); Joshua Chiet, San Francisco, CA (US); John Rector, San Francisco, CA (US)

(73) Assignee: DIALPAD, INC., San Ramon, CA (US)

( * ) Notice: Subject to any disclaimer, the term of this patent is extended or adjusted under 35 U.S.C. 154(b) by 152 days.

(21) Appl. No.: 16/684,444

(22) Filed: Nov. 14, 2019

Related U.S. Application Data

(63) Continuation-in-part of application No. 16/182,603, filed on Nov. 6, 2018, now Pat. No. 10,999,443.

(51) Int. Cl.
*H04L 12/66* (2006.01)
*H04M 7/00* (2006.01)
(Continued)

(52) U.S. Cl.
CPC ......... *H04M 7/0069* (2013.01); *H04M 7/009* (2013.01); *H04M 7/0033* (2013.01); *H04M 7/0078* (2013.01); *H04M 7/127* (2013.01); *H04M 7/128* (2013.01); *H04M 7/1285* (2013.01); *H04Q 3/0025* (2013.01); *H04Q 2213/1322* (2013.01); *H04Q 2213/13292* (2013.01)

(58) Field of Classification Search
None
See application file for complete search history.

(56) References Cited

U.S. PATENT DOCUMENTS

| 6,597,686 B1 | 7/2003 | Smyk |
| 6,865,266 B1 | 3/2005 | Pershan |

(Continued)

OTHER PUBLICATIONS

"SIP Trunking 101: the Fundamentals", https://www.sip.us/blog/latest-news/sip-trunking-101-the-fundamentals/, SIP. US, LLC, Jan. 16, 2017, Accessed Sep. 26, 2019, 6 pgs.
(Continued)

*Primary Examiner* — Bob A Phunkulh
(74) *Attorney, Agent, or Firm* — Patent Law Works LLP

(57) ABSTRACT

A system and computer-implemented method for providing telephony communication services for VoIP or analog telephony devices using an on-premises gateway and remotely located VoIP system are described. Some implementations of the methods may include generating a configuration file mapping a plurality of tag extensions to a plurality of analog telephone ports of a high-density analog telephony adapter (HDATA), which may be communicatively coupled to the VoIP system. The VoIP system may transmit the configuration file to the HDATA, receive a telephony service request, and determine a tag extension based on the telephony service request. The VoIP system may transmit an identification of the tag extension to the HDATA and route a telephony service to the HDATA via the communication channel using the tag extension.

11 Claims, 6 Drawing Sheets

(51) Int. Cl.
*H04M 7/12* (2006.01)
*H04Q 3/00* (2006.01)

(56) References Cited

U.S. PATENT DOCUMENTS

| | | | |
|---|---|---|---|
| 6,909,711 B1* | 6/2005 | Noguchi | H04L 29/06027 370/353 |
| 7,277,421 B1 | 10/2007 | Pershan | |
| 7,586,899 B1 | 9/2009 | Mohaban et al. | |
| 7,620,164 B1* | 11/2009 | Farah | H04M 7/125 370/352 |
| 7,965,699 B1 | 6/2011 | Accardi et al. | |
| 8,855,287 B1* | 10/2014 | Bates | H04L 65/1089 379/207.02 |
| 9,264,299 B1 | 2/2016 | Palmer et al. | |
| 9,331,888 B1 | 5/2016 | Conway | |
| 9,443,010 B1 | 9/2016 | Sundeby et al. | |
| 2002/0118671 A1 | 8/2002 | Staples et al. | |
| 2002/0194504 A1* | 12/2002 | Leskuski | H04L 12/1403 726/4 |
| 2003/0053442 A1 | 3/2003 | Purpura et al. | |
| 2003/0072300 A1 | 4/2003 | Kwon | |
| 2003/0072301 A1 | 4/2003 | Ko | |
| 2004/0073566 A1* | 4/2004 | Trivedi | H04L 61/1529 |
| 2004/0266426 A1 | 12/2004 | Marsh et al. | |
| 2005/0041642 A1 | 2/2005 | Robinson | |
| 2006/0007915 A1* | 1/2006 | Frame | H04M 7/0057 370/352 |
| 2006/0013195 A1 | 1/2006 | Son et al. | |
| 2006/0159062 A1 | 7/2006 | Huang et al. | |
| 2007/0201651 A1 | 8/2007 | Bontempi | |
| 2007/0286174 A1* | 12/2007 | Brannan | H04M 7/0069 370/356 |
| 2008/0056235 A1 | 3/2008 | Albina et al. | |
| 2008/0084991 A1* | 4/2008 | Chuang | H04M 1/2535 379/359 |
| 2008/0089494 A1 | 4/2008 | Kaas et al. | |
| 2008/0112392 A1* | 5/2008 | Mansfield | H04L 12/66 370/352 |
| 2008/0175167 A1* | 7/2008 | Satyanarayanan | H04L 43/0882 370/254 |
| 2009/0022149 A1 | 1/2009 | Rosenberg et al. | |
| 2009/0046845 A1 | 2/2009 | Lewis et al. | |
| 2009/0080411 A1 | 3/2009 | Lyman | |
| 2009/0180600 A1 | 7/2009 | Blackwell et al. | |
| 2010/0082828 A1 | 4/2010 | Jennings et al. | |
| 2010/0162034 A1 | 6/2010 | Degenhardt et al. | |
| 2010/0223494 A1 | 9/2010 | Degenhardt et al. | |
| 2010/0290609 A1 | 11/2010 | Clark et al. | |
| 2011/0280390 A1 | 11/2011 | Lawson et al. | |
| 2011/0283259 A1 | 11/2011 | Lawson et al. | |
| 2011/0299548 A1 | 12/2011 | Chen et al. | |
| 2014/0313941 A1 | 10/2014 | Dwarkha et al. | |
| 2014/0362850 A1* | 12/2014 | Wakely | H04L 65/608 370/352 |
| 2015/0117622 A1* | 4/2015 | Fandrianto | H04M 7/0066 379/93.05 |
| 2015/0296079 A1 | 10/2015 | Song | |
| 2017/0064086 A1* | 3/2017 | Mandalia | H04L 65/1053 |
| 2019/0158371 A1 | 5/2019 | Dillon et al. | |

OTHER PUBLICATIONS

Ying-Hui Chen, "5 Analog Telephone Adapters (ATA) Under $60 for Small-to-Medium Businesses", VoIP Insider, https://www.voipsupply.com/blog/voip-insider/5-analog-telephone-adapters-ata-60-small-medium-businesses/, Jan. 11, 2018, Accessed Sep. 26, 2019, 6 pgs.

"Digital and Analog Media Gateways Mediapack 1288", AudioCodes Limited, https://web.archive.org/web/20190602094921/https://www.audiocodes.com/solutions-products/products/digital-and-analog-media-gateways/mediapack-1288, WayBackMachine Jun. 2, 2019, Accessed Jan. 2, 2020, 6 pgs.

"OBihai OBi508vs—8 FXS Analog Gateway for VoIP", https://www.voipsupply.com/obihai-obi508vs, Accessed Oct. 3, 2019, 2 pgs.

* cited by examiner

ON PREMISES GATEWAYS INTERCONNECTING VOIP SYSTEMS, THE PUBLIC SWITCHED TELEPHONE NETWORK AND PRIVATE BRANCH EXCHANGES AND OTHER TELEPHONY INFRASTRUCTURE

TECHNICAL FIELD

This disclosure pertains generally to Voice over Internet Protocol (VoIP) technology and to on-premises gateways that interconnect VoIP systems, the public switched telephone network (PSTN), Private Branch Exchanges and other telephony infrastructure.

BACKGROUND

Voice over Internet Protocol enables the delivery of voice communication over Internet Protocol (IP) networks, such as the public Internet or private IP networks, as opposed to conventional public switched telephone network (PSTN). Processing VoIP telephone calls involves signaling, channel setup, digitization of the analog voice signals and encoding. Instead of being transmitted over a circuit switched network, the digital information is packetized, and IP packets are transmitted a packet switched network. Contemporary providers of VoIP enable dynamic interconnection between users on any two domains on the Internet, using VoIP phones, or VoIP software running on personal computers, smart phones, or other devices capable of running applications and connecting to a network.

VoIP has many advantages over conventional PSTN telephony, including bandwidth efficiency, pricing, convenience, and the availability of many additional features. Many contemporary organizations are switching their telephony systems and service from PSTN to VoIP. However, some organizations cannot readily terminate their current PSTN telephone service (or, for that matter, switch between one VoIP service provider and another). For example, regulations in some jurisdictions prohibit or limit porting telephone numbers. This can be an issue because an organization may have a hard requirement of keeping its existing numbers. Further, an organization may have a business need to have regional as opposed to VoIP phone numbers, e.g., to appear more professional. Local regulations may dictate that origination-level telephony service must be delivered to the site of the organization. Organizations may be locked into long term contractors with providers of telephone service.

Thus, an organization may wish to utilize a given VoIP system while at the same time maintaining its current telephone service. However, this can result in certain incompatibilities. An organization's current telephony infrastructure and a given target VoIP system may not be wholly compatible. For example, many roles or functionalities performed by one system cannot be extended to or substituted with the other using conventional means or techniques.

In addition, some organizations move to VoIP or to a new VoIP system in stages, keeping their existing private branch exchange (PBX), while at the same time adding some VoIP telephony service from a target VoIP system. A PBX is a telephone exchange system that serves an organization and performs concentration of central office lines or trunks to provide intercommunication between a large number of telephones in the organization. The central office lines provide connections to the PSTN. The concentration aspect of a PBX permits the shared use of these lines between all telephone stations in the organization. Its intercommunication ability allows two or more telephones to directly connect without using the public switched telephone network, often using four- or five-digit extensions, rather than full telephone numbers. Conventionally, the use of such extensions and certain other PBX-level functionality is not supported outside of the PBX (e.g., by external VoIP telephony devices connecting to telephones that are part of the PBX exchange).

It would be desirable to address these issues.

SUMMARY

According to various implementations and variations, an on-premises gateway (OPG) is located within an organization site, and interconnects a VoIP system with telephone service (e.g., PSTN service) provided by the organization's telephone service provider. The systems and methods described herein may include various operations for providing telephony trunking and/or access of a plurality of legacy analog telephony devices to a PSTN via a VoIP system.

The methods may include generating a configuration file mapping each one of a plurality of tag extensions to one or more of a plurality of analog telephone ports of a high-density analog telephony adapter (HDATA). The plurality of analog telephone ports may couple the HDATA to a plurality of analog telephone devices and the HDATA may be communicatively coupled to a server via a communication channel. A tag extension may include, for example, a computer-addressable opaque string.

The methods may include transmitting the configuration file via the communication channel from the server (e.g., the VoIP system) to the HDATA.

The methods may include receiving a telephony service request and determining a first tag extension of the plurality of tag extensions based on the telephony service request. The first tag extension may be mapped to a first analog telephone port in the configuration file. Determining the first tag extension may include determining an account associated with the telephony service request, and determining one or more tag extensions, including the first tag extension, associated with the account. Determining the first tag extension may include determining an address of the HDATA based on the telephony service request.

The methods may include transmitting an identification of the first tag extension to the HDATA, and routing a telephony service associated with the telephony service request to the HDATA via the communication channel based on the identification of the first tag extension. Transmitting the identification of the first tag extension to the HDATA may include transmitting the identification of the first tag extension to the address of the HDATA via the communication channel, such as an Internet connection, via which the telephony service may be routed to the HDATA.

In some implementations, the HDATA may be registered with the server as a single session initiated protocol (SIP) device, and the telephony service associated with the telephony service request may be routed to the HDATA via the communication channel by initiating a SIP session with the HDATA via the communication channel. For example, initiating the SIP session with the HDATA via the communication channel may cause the HDATA to route the telephony service to the first analog telephone port.

The methods may include identifying an address of a voice over internet protocol (VoIP) telephone device associated with the account, and routing the telephony service associated with the telephony service request to the VoIP telephone device using the identified address of the VoIP telephone device. In some implementations, the operations of the methods may cause a first analog telephone device coupled with the first analog telephone port to ring based on the telephony service request, where ringing comprising issuing one or more of an audible, a tactile, and a visual alert indicating an incoming telephony service. The operations may cause the VoIP telephone device at the address of the VoIP telephone device to ring based on the telephony service request, determine that one of the first analog telephone device and the VoIP telephone device have been answered, and connect the telephony service with the one of the first analog telephone device and the VoIP telephone device that were answered.

In some instances, the one or more tag extensions associated with the account comprise the first tag extension and a second tag extension mapped to a second analog telephone port of the plurality of analog telephone ports. The method may further include transmitting an identification of the second tag extension to the HDATA. Routing the telephony service may include routing the telephony service to the first analog telephone port and the second analog telephone port.

In some implementations, an online configurator graphical user interface may be generated that receives configuration input instructing the server to map the first tag extension to the first analog telephone port. Responsive to receiving the configuration input via the online configurator graphical user interface, the first tag extension may be mapped to the first analog telephone port in a mapping file accessible by the server. The mapping file may indicate an account from which the configuration input was received and a configuration file may be generated based on or including the mapping file. In some instances, the online configurator graphical user interface displays representations of the HDATA, the plurality of analog telephony ports of the HDATA, and the plurality of analog telephone devices associated with the plurality of analog telephone ports.

In some implementations, the system described herein may include an on-premises gateway located within an organization site wherein the on-premises gateway communicatively couples a remotely located voice over internet protocol (VoIP) system and at least one of a VoIP telephony device and a private branch exchange (PBX) located within the organization site. The VoIP system may be interconnected to a public PSTN to provide services from the PSTN to the components at the organization site.

In some implementations, the on-premises gateway extends a service of the PSTN to the at least one of the VoIP telephony device and the PBX including routing an outgoing call from the at least one of the VoIP telephony device and the PBX to the PSTN via the on-premises gateway and the VoIP system. For example, routing the outgoing call may include receiving an incoming call from the PSTN by the VoIP system, and forwarding, by the VoIP system, the outgoing call to the at least one of the VoIP telephony device and the PBX using the on-premises gateway.

In some implementations, the VoIP system may route an incoming call from the VoIP system to the at least one of the VoIP telephony device and the PBX. For example, the VoIP system may receiving the incoming call from the PSTN, determine that a phone number being called in the incoming call is assigned to the PBX, and route the incoming call through the on-premises gateway to the PBX.

Depending on the implementation, the on-premises gateway may include a session initiate protocol (SIP) trunk or a time division multiplexing (TDM) trunk.

In some implementations, extending the service of the PSTN to the at least one of the VoIP telephony device and the PBX may include routing a second incoming call from the VoIP system to the at least one of the VoIP telephony device and the PBX. For instance, the second incoming call may be received by the VoIP system from a second VoIP telephony device.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various example implementations for purposes of illustration only. One skilled in the art will readily recognize from the following discussion that alternative examples of the structures and methods illustrated herein may be employed without departing from the principles described herein.

DETAILED DESCRIPTION

Figure 1:
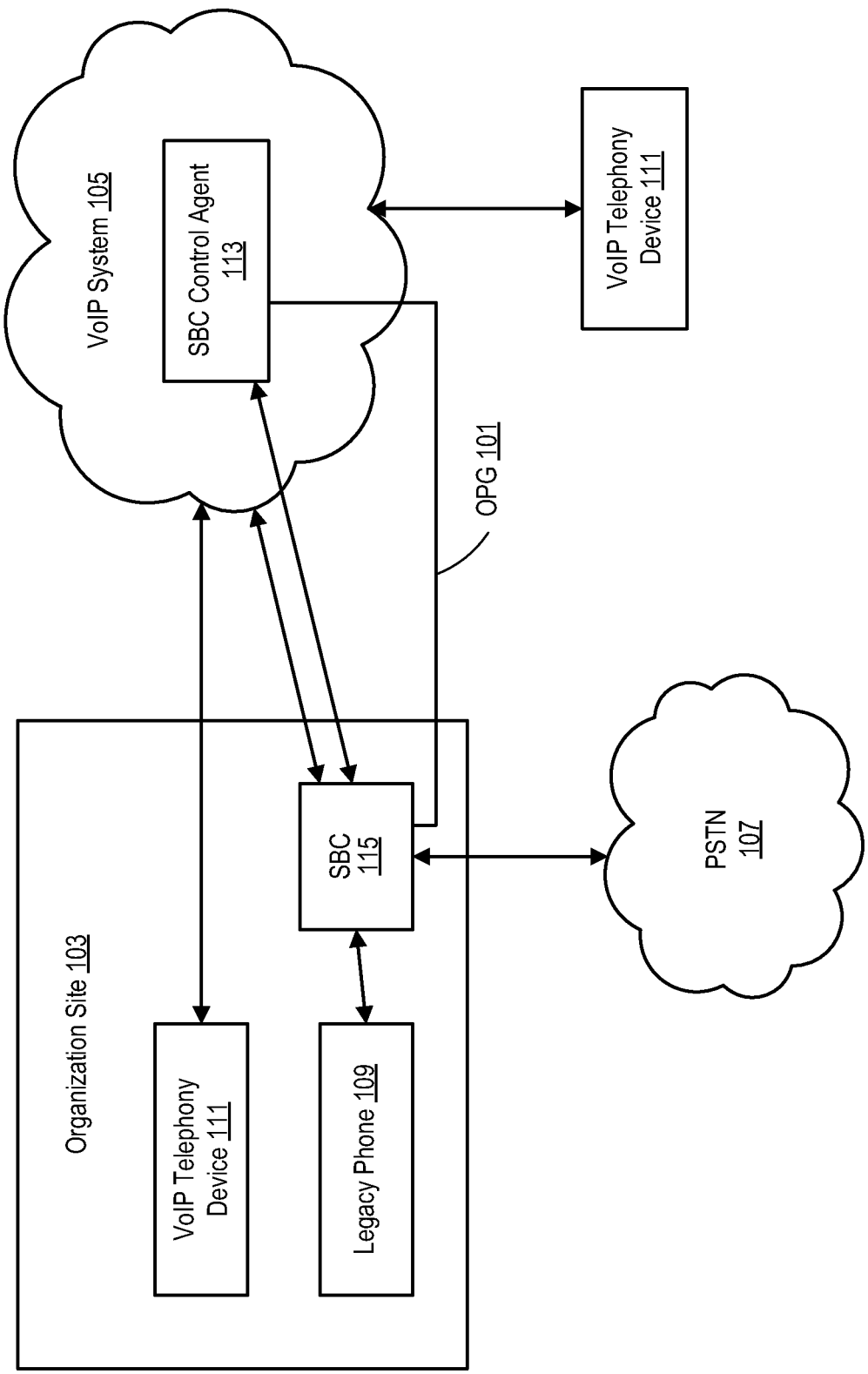
FIG. 1 is a block diagram illustrating an on-premises gateway device (OPG) deployed at an organization site, and interconnecting a VoIP system, a PSTN and various telephony devices, according to some implementations.

FIG. 1 is a block diagram illustrating an exemplary on premises gateway device (OPG) 101 deployed in an organization site 103, and interconnecting a VoIP system 105, a PSTN 107, VoIP telephony devices 111 and legacy telephones 109, according to some implementations. A VoIP telephony device 111 can be a VoIP phone, or a network enabled computing device running VoIP software. The OPG 101 can be implemented as hardware, software and/or firmware. In one implementation, the OPG 101 is in the form of an OPG control agent 113 (also referred to herein as an SBC control agent 113) running on a computing device, which can be located, for example, at a remote site connected to the organization site 103 over a network (e.g., in the cloud), in combination with a hardware Session Boarder Controller (SBC) 115, such as, for example, an SBC 115 of the type currently available from vendors such as Audio- Codes or Sonus. It is to be understood that although the OPG 101, OPG control agent 113 and the SBC 115 are illustrated as individual entities, each of these entities represents a collection of functionalities, which can be instantiated as single or multiple components and/or modules as desired. It is to be understood that the OPG control agent 113 can be instantiated as software, firmware, hardware, or any combination of these. It is to be understood that the OPG control agent 113 can be instantiated (for example as object code or executable images) within the system memory (e.g., RAM, ROM, flash memory) of any computing device, such that when the processor of the computing device executes, interprets or otherwise processes content of the OPG control agent 113, the computing device executes the associated functionality. It is to be understood that although a single SBC 115 is illustrated in FIG. 1, an OPG 101 can include multiple SBCs 115 (e.g., multiple communicatively coupled devices), or can include other and/or additional devices capable of connecting to telephones and/or telephone networks. Which features are performed by the OPG control agent 113 and which by the underlying SBC 115 (or other device) under the control of the OPG control agent 113 varies between implementations.

The OPG 101 is installed at an organization site 103 configured for telephony, such as a building or other physical location within an organization containing telephones, a PBX or similar mechanism for managing telephony exchange within the site 103, and a PSTN circuit connecting the site 103 to the PSTN 107. Some examples of organization sites 103 that can be configured for telephony are individual building, other forms of installations, or sections thereof on the premises or under the management of an enterprise, university, government, department, etc. In the example implementation illustrated in FIG. 1, the OPG 101 replaces the conventional PBX (not illustrated in FIG. 1). The OPG 101 communicates with the PSTN 107, for example by using Time-division Multiplexing (TDM). The OPG 101 also communicates with the VoIP system 105, for example using Session Initiation Protocol (SIP).

As illustrated in FIG. 1, the OPG 101 can manage both legacy telephones 109 and VoIP telephony devices 111. VoIP telephony devices 111 within or outside of the organization site 103 can connect to the VoIP system 105, which connects to the OPG 101. Legacy telephones 109 within the organization site 103 can connect to the OPG 101, which can interconnect them to the PSTN 107 or the VoIP system 105. It is to be understood that although FIG. 1 illustrates the OPG 101 being connected to the PSTN 107, in other implementations the organization could receive its phone service through a VoIP provider separate from the VoIP system 105, in which case the OPG 101 could instead connect to the external telephone system using, e.g., SIP. In this scenario, the OPG 101 could still provide the same functionalities described below.

The OPG 101 enables the organization to maintain and use its phone numbers assigned by its telephone service provider with VoIP telephony devices 111 communicating through the VoIP system 105, without the need for the organization's telephone service provider to port those telephone numbers. Instead, the OPG 101 can associate given numbers with specific VoIP telephony devices 111, and route inbound calls placed to the given numbers to the specific VoIP telephony devices 111 associated with those numbers, without requiring that the organization's telephone service provider port the numbers, or even be aware that the numbers have been assigned to the VoIP telephony devices 111 at all. It is to be understood that the OPG 101 can also continue to support legacy telephones 109 within the organization site 103. For example, some numbers assigned by the organization's telephone service provider can remain associated with legacy telephones 109, and the OPG 101 can route inbound calls to these legacy telephones 109. In a scenario where the organization's telephone service provider is a VoIP service provider, the same is true for continued support of VoIP phones within the organization site 103 with numbers assigned by organization's telephone service provider.

In a similar manner, the OPG 101 can also process outbound calls from VoIP telephony devices 111 (and/or legacy telephones 109) associated with numbers assigned by the PSTN service provider. Outbound calls placed by a VoIP device 111 associated with a given number can be routed by the VoIP system 105 to the OPG 101, which can then route the call to a destination telephone such that its originating number is the number assigned by the PSTN service provider. Such routing can be through either the VoIP system 105 or the PSTN 107, depending upon the destination. Calls from legacy telephones 109 can be processed by the OPG 101 and routed to their destination through the PSTN 107 or the VoIP system 105.

It is to be understood the above-described functionality the OPG 101 can reassign telephone numbers provided by the organization's telephone service provider as desired, thereby porting specific numbers to specific VoIP telephony devices 111 utilizing the VoIP system 105 for any length of time, from an individual session to indefinitely. This may be beneficial because in some jurisdictions or under certain contracts, the porting of the numbers by the organization's telephone service provider is not possible or practicable.

Another functionality that can be provided by the OPG 101 in this context is support for calling emergency services numbers (e.g., 911 in the US, 119 in Japan, 112 in much of Europe, 123 in Egypt, etc.) from the VoIP system 105. Although, in some jurisdictions, such as the US, emergency service numbers are generally supported over VoIP, in some other jurisdictions, calls to emergency service numbers are not accepted from VoIP systems 105 (or other telephony networks outside of the PSTN 107), but instead only from PSTN telephony devices (e.g., land lines receiving service from a PSTN service provider). The OPG 101 enables access to calls to emergency numbers made through the VoIP system 105 by accessing the PSTN 107 (e.g., using TDM) and routing the call to the emergency service provider through the PSTN 107. Thus, the OPG 101 routes the call from the VoIP system 105 to the emergency service number through the PSTN 107, rather than through the VoIP system 105 from which it originated but would not be accepted.

The same issue may occur in some jurisdictions with calls to toll-free numbers (e.g., 800 numbers in the US and China, 0800 numbers in Japan and the UK, 1800 number in Australia, etc.). In some jurisdictions, calls to such numbers are only accepted through the PSTN 107, not from VoIP systems 105. As with calls to emergency service numbers, the OPG 101 provides access to calls to toll free numbers made through the VoIP system 105 by routing the call through the PSTN 107. The same problem and solution are also applicable in some jurisdictions for calls to local service numbers (e.g., numbers to request non-emergency assistance, municipal information, weather forecast, correct time, directory assistance, traffic information, report a gas leak, etc.).

Another functionality that can be performed by the OPG 101 is provision of coherent caller id information for calls originating from the VoIP system 105. Least cost routing (LCR) is the process of selecting the path for traffic based on cost. According to LCR, routes can be selected and updated (monthly, weekly, daily, etc.) from different carriers for destinations across the world. Telephone service providers buy routes from other providers, who in turn buy from other providers, etc. Neither the VoIP system 105 nor the PSTN 107 have full information of what carriers will be serving routes up and down stream. As calls are routed between carriers, caller id information associated with a given call can be changed, dropped, or otherwise processed. For example, some telephone networks in some countries do not allow caller-ID spoofing, and may even limit or prohibit the passing of caller ID information into their telephone network from outside of it, instead replacing the caller id information to indicate that the caller is international, anonymous, etc. As a result, caller id information can be mangled or altered as calls are routed between carriers.

To address this issue, the OPG 101 can connect directly to a telephone network that limits, blocks or otherwise alters caller id information, and provide the desired caller id information from calls being placed through the OPG 101, including calls originating from VoIP telephony devices 111 outside of the organization site or other calls originating from the VoIP system 105. Without the OPG 101 providing this functionality, it is unpredictable what caller id information would be displayed for these calls by the receiving telephone.

The OPG 101 can also extend services provided by the VoIP system 105 to legacy telephones 109 (or other types of telephony devices) within the organization site 103 that communicate with the PSTN 107 (or other type of telephone network made accessible to the organization through its telephone service provider). For example, one feature available on some VoIP systems 105 is the display of information concerning the party being called, before the call is placed. When the caller enters a number (or even a section of a number) on a VoIP telephony device 111, the VoIP system 105 may provide information concerning the party to whom the call is being made, such as name, picture, title, etc., which is displayed by the VoIP telephony device 111 for the benefit of the caller. This information can be displayed prior to the call being answered. Conventionally, when a caller operating a legacy phone 109 within the organization site 103 places a call, such information would not be available. The same is true of any call not originating from the VoIP system 105. However, when a call is made from a legacy phone 109 (or other type of telephone) through the OPG 101, the OPG can obtain the information concerning the party being called based on the number from the VoIP system 105 and pass that information back to the legacy phone 109, where it can be displayed to the caller. In other words, the OPG 101 extends a service of the VoIP system 105 to phones outside of the VoIP system 105, to which such services would not otherwise be available.

Figure 2:
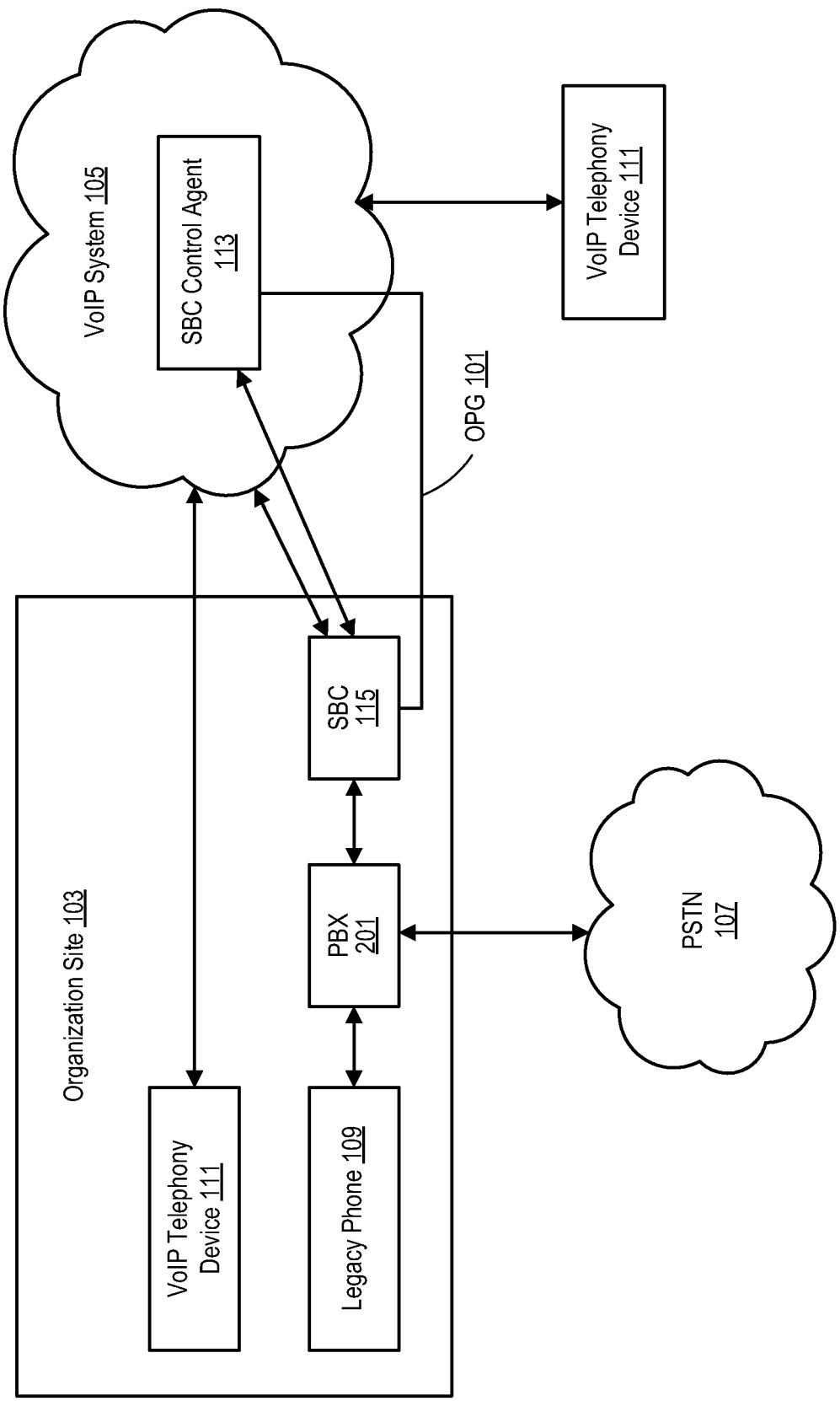
FIG. 2 is a block diagram illustrating an OPG deployed at an organization site, and interconnecting a VoIP system and a PBX, according to some implementations.

FIG. 2 is a block diagram illustrating an exemplary on premises gateway device (OPG) 101 deployed in an organization site 103, and interconnecting a VoIP system 105 and a PBX 201, according to some implementations. In the example implementation illustrated in FIG. 2, the OPG 101 communicates with the PBX 201, for example by using Time-division Multiplexing (TDM) or SIP in the case of a VoIP PBX $201_{VoIP}$ (not illustrated) as described below. The OPG 101 also communicates with the VoIP system 105, for example using SIP. The PBX 201 communicates with the PSTN 107, e.g., using TDM. As described above, in implementations other than the specific ones illustrated in FIGS. 1 and 2, the organization may receive its phone service through a VoIP provider separate from the VoIP system 105. In this case, a VoIP PBX $201_{VoIP}$ could be utilized, which could be connected to the external telephone system using, e.g., SIP.

In the specific implementation illustrated in FIG. 2, legacy phones 109 within the organization site 103 are interconnected to the PBX 201, and VoIP telephony devices 111 both within and outside of the organization site 103 are interconnected to the VoIP system 105.

PBXs 201 enable multiple telephones that are part of the PBX exchange to directly connect without using the PSTN 107 or an external telephone network. One advantage of this is the use of extensions (e.g., four or five digit), rather than full telephone numbers, to place calls between telephones within the exchange. Parties within organizations (e.g., companies, educational institutions, government departments, etc.) frequently use such extensions to place calls to each other, and may not even know the full numbers of the other parties. The OPG 101 extends the use of extensions to calls made to or from VoIP telephony devices 111 through the VoIP system 105, outside of the PBX. As explained above in conjunction with FIG. 1, the OPG 101 may route telephone calls to telephone numbers assigned by the organization's telephone service provider to other devices, such as VoIP telephony devices 111 interconnected to the VoIP system 105. The OPG 101 can further track extensions associated with such telephone numbers by the PBX 201, and port the extensions along with the numbers. Thus, when calls are placed through the PBX 201 (e.g., from legacy telephones 109 within the organization site 103) to an extension of a number associated with a VoIP telephony device 111 outside of the PBX 201, the OPG 101 can route the call to the VoIP telephony device 111 through the VoIP system 105. When calls are made to extensions from VoIP telephony device 111 through the VoIP system 105, the OPG 101 can route the calls to the destination, either through the PBX 201 or the VoIP system 105 as appropriate, depending upon whether the destination telephone is within or outside of the PBX exchange.

It is to be understood that the functionalities described in conjunction with FIG. 1 can also be performed by the OPG 101 in the implementation in FIG. 2, with the OPG communicating with the PBX 201 instead of the PSTN 107 directly.

Figure 3:
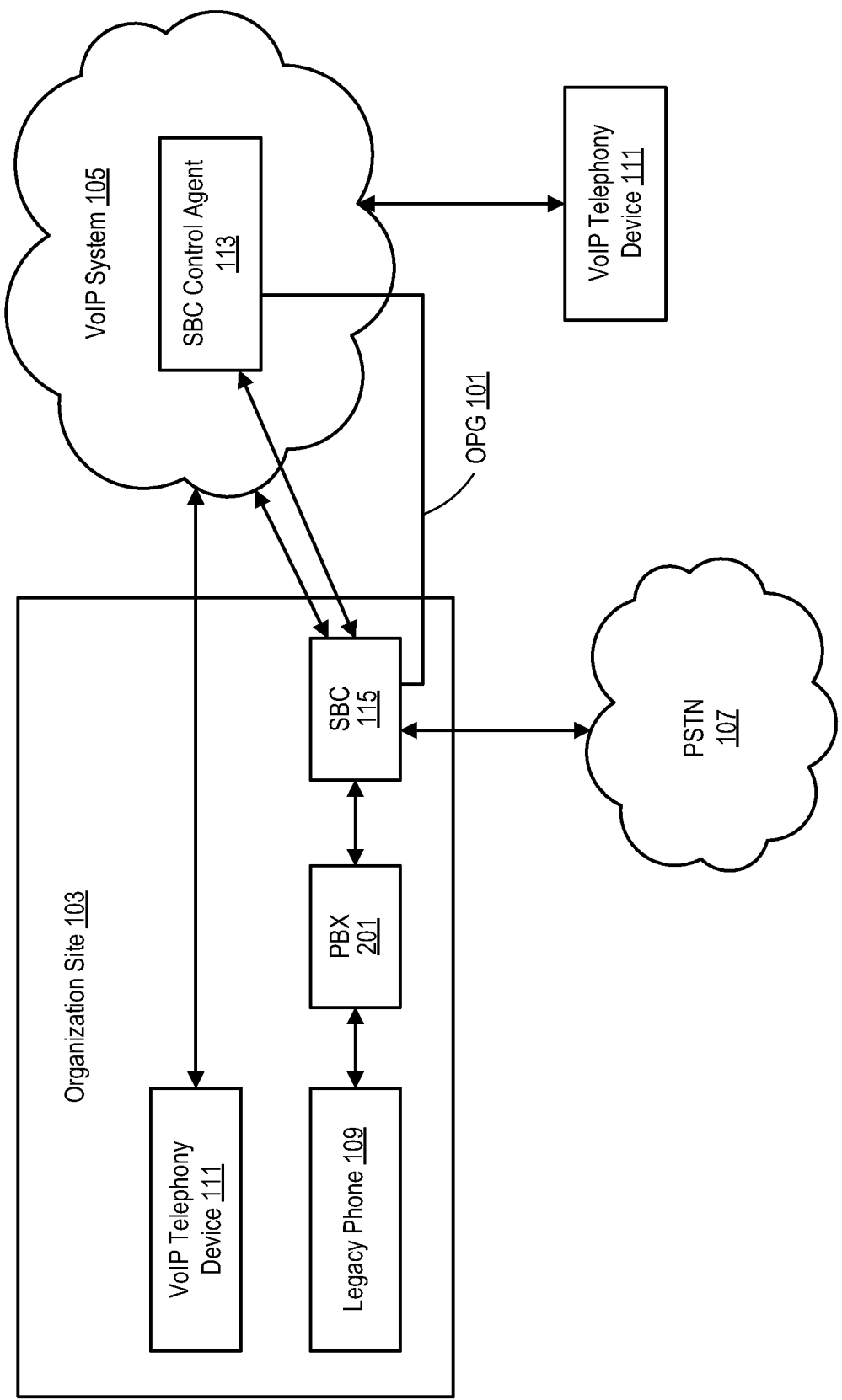
FIG. 3 is a block diagram illustrating an OPG deployed at an organization site, and interconnecting a VoIP system, a PBX, a PSTN and various telephony devices, according to some implementations.

FIG. 3 is a block diagram illustrating an OPG 101 deployed at an organization site 103, and interconnecting a VoIP system 105, a PBX 201, a PSTN 107, a legacy phone 109 and multiple VoIP telephony devices 111, according to some implementations. In the example implementation illustrated in FIG. 3, the OPG 101 communicates with the PBX 201 as in the implementation of FIG. 2, for example by TDM (SIP in the case of a VoIP PBX 201). However, rather than the PBX 201 being connected directly to the PSTN 107 as in FIG. 2, the OPG 101 is connected to the PSTN 107, as in FIG. 1. Thus, communication between the PBX 201 and the PSTN 107 is via the OPG 101. In addition to communicating with the PBX 201, the OPG 101 communicates with the VoIP system 105, for example using SIP, and with the PSTN 107, e.g., using TDM.

In the specific implementation illustrated in FIG. 3, legacy phones 109 within the organization site 103 are interconnected to the PBX 201, which is in turn interconnected to the OPG 101, which is interconnected to the PSTN 107. VoIP telephony devices 111 both within and outside of the organization site 103 are interconnected to the VoIP system 105, which is interconnected to the OPG 101. It is to be understood that the functionalities described in conjunction with FIGS. 1 and 2 can also be performed by the OPG 101 in the implementation in FIG. 3, with the OPG 101 communicating with the PBX 201 and the PSTN 107.

Another benefit that can be provided by the OPG 101 is secure transfer of phone calls originating from outside of the VoIP system 105 (e.g., PSTN calls) between VoIP servers in the VoIP system 105. For example, suppose a caller operating an external telephone 109 places a call to an automated VoIP telephony device 111 of the VoIP system 105 (e.g., by calling a general information number for a company). In the implementations of FIG. 1 or 2, this call would be routed from the external telephone 109 to the VoIP server by the OPG 101. Suppose the VoIP server answers and plays an Interactive Voice Response (IVR) menu that instructs the caller to, for example, "Press 1 for Sales or Press 2 for support." The caller could then press, e.g., 2, and be transferred to a different VoIP telephony device 111 (which can in this context be thought of a second VoIP server as it is not instantiated as a single VoIP phone but a telephony interface into a department or the like) associated with the support team, and ultimately to a member of the support team, and a conversation would ensure until the support center or the caller hangs up. What happens in this scenario is that the call goes from the external telephone 109 to the OPG 101 to the first VoIP server in the VoIP system 105, which plays the IVR menu. However, upon receiving the pressed digit from the caller, the TE1 determine that the call is to be transferred to the second VoIP server, in this example the one associated with the support team.

When transferring calls to VoIP servers and other VoIP telephony devices 111 within the VoIP system 105, it can be desirable to use a secure communication protocol to establish a secure connection between the originating telephone and the VoIP server to which the call is being transferred. Recall that the VoIP servers and other VoIP telephony devices 111 can be in the form of programmable computers, subject to attack and compromise, and it is prudent to secure incoming communication, especially in the case of organization level VoIP servers. For this reason, VoIP system may use a secure protocol such as Secure Real-Time Transport Protocol (SRTP or Secure RTP). SRTP is an extension to RTP (Real-Time Transport Protocol) that incorporates enhanced security features such as encryption, key exchange, message authentication and integrity and replay attack protection. Like RTP, it is suitable for use in VoIP communications.

Without the use of the OPG 101 functionality described herein, attempting to transfer the PSTN call from the first VoIP server to the second VoIP server where the second VoIP server is expecting a secure media communication channel via SRTP would fail-instead of being transferred the call would drop after the caller pressed a digit. This is the case because the media communication channel between the OPG 101 and the second VoIP server require encryption keys, but the keys were never exchanged in the signaling, resulting in an OPG 101 and the second VoIP server being unable to decrypt each other's media streams.

In one implementation, the OPG 101 solves this shortcoming by using Third Party Call Control (3PCC) to facilitate transfer of the PSTN call from the first to the second VoIP server. 3PCC is an Internet Engineering Task Force (IETF) standard. For instance, for the transfer of the call from the first to the second VoIP server, the OPG 101 can facilitate the transfer using 3PCC as follows. The first VoIP server first sends an INVITE to the OPG 101 (1). In response, the OPG 101 sends an offer to the first VoIP server, offer1 (2). The first VoIP server needs to send its answer to offer1 in the ACK to the OPG 101. To obtain this answer, the first VoIP server sends the offer1 which it received from the OPG 101 in an INVITE to the second VoIP server (3). In response, the second VoIP server sends an OK to the first VoIP server (4). This OK contains the answer to offer1, answer1. The first VoIP server sends an ACK to the second VoIP server (5), and sends answer1 in the ACK it owes to the OPG 101 (6). Because the offer was generated by the OPG 101, and the answer generated by the second VoIP server, the actual established session is between the OPG 101 and the second VoIP server. Therefore, traffic flows between the OPG 101 and the second VoIP server (7). In this description, "offer1" and "answer1" are signaling messages that contain the security keys from OPG 101 to the second VoIP server and from the second VoIP server to the OPG 101, which are necessary to establish a secure channel between the OPG 101 and the second VoIP server.

By employing 3PCC as described above, the OPG 101 enables a PSTN gateway solution that facilitates both (1) secure media channel functionality while simultaneously providing for (2) transfer features used for handling telephony features such as IVR menus. It is to be understood that 3PCC does not, by itself, provide this security, but when applied by the OPG 101 as described above, it able to be used to enable secure media connections.

Figure 4:
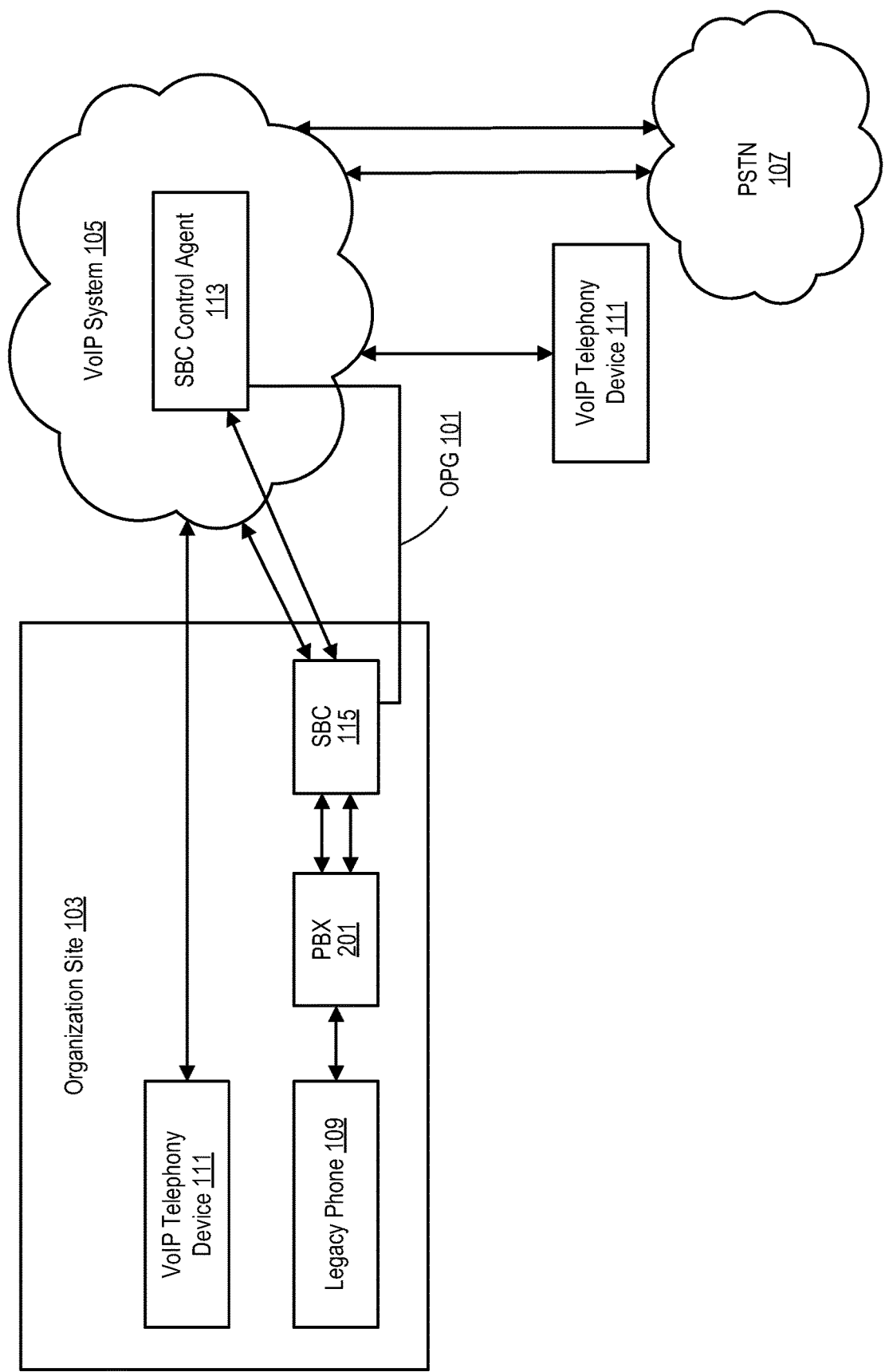
FIG. 4 is a block diagram illustrating an OPG deployed at an organization site and interconnecting a VoIP system, PBX, PSTN, legacy phone, and multiple VoIP telephony devices, according to some implementations.

FIG. 4 is a block diagram illustrating an OPG 101 deployed at an organization site 103, and interconnecting a VoIP system 105, a PBX 201, a PSTN 107, a legacy phone 109 and multiple VoIP telephony devices 111, according to some implementations. In addition to the implementations and functionalities described above, OPGs 101 have many other uses as well, for example, OPGs 101 can be utilized to support telephony trunking (e.g., SIP trunking), such as in scenarios in which PSTN access is provided by the VoIP system 105. The telephony trunking may allow an organization to use both VoIP and conventional PSTN access with or without a PBX 201.

In the example implementation illustrated in FIG. 4, the OPG 101 communicates with the PBX 201 and/or legacy phones 109, as in the implementations of FIGS. 2 and 3, for example by TDM (or SIP in the case of a VoIP PBX 201). However, rather than the PBX 201 being connected directly to the PSTN 107 as in FIG. 2, the VoIP system 105 is connected to the PSTN 107. Thus, communication between the PBX 201 or legacy phone 109 and the PSTN 107 is via the OPG 101 and/or the VoIP system 105. In addition to communicating with the PBX 201, the OPG 101 communicates with the VoIP system 105, for example using SIP, and with the PSTN 107 via the VoIP system 105, which may communicate with the PSTN 107, for example, using TDM.

In the example implementation illustrated in FIG. 4, legacy phones 109 within the organization site 103 may be interconnected to the PBX 201, which is in turn interconnected to the OPG 101, which is interconnected to the PSTN 107 via the VoIP system 105. VoIP telephony devices 111, within or outside of the organization site 103, may be interconnected to the VoIP system 105, which is interconnected to the OPG 101. It is to be understood that the functionalities described in conjunction with the other figures described herein can also be performed by the OPG 101 in the implementation in FIG. 4. Further details described in reference to FIGS. 1-3 and 5-6 may also be applicable to FIG. 4, although not described again in reference to FIG. 4.

For example, rather than telephony traffic being communicated directly from the PBX 201, SBC 115, or legacy phone 109 with the PSTN 107, the telephony traffic may traverse a path via the OPG 101 and VoIP system 105 to the PSTN 107. These implementations allow a PSTN service to be transferred to a VoIP service provider (e.g., associated with the VoIP system 105).

In some implementations, the OPG 101 may be located within an organization site 103 and may communicatively couple a remotely located VoIP system 105, at least one of a VoIP and/or a legacy telephony device (e.g., 111 or 109), and/or a PBX 201 located within the organization site 103. The VoIP system 105 may also be interconnected to a PSTN 107, as illustrated.

In some implementations, the OPG 101 may extend a service of the PSTN 107 to the at least one of the legacy phone 109 (or VoIP telephony device 111) and the PBX 201, for instance, by routing an outgoing call from the at least one of the VoIP telephony device 111 and the PBX 201 to the PSTN 107 via the OPG 101 and the VoIP system 105. In some instances, routing the outgoing call includes receiving an incoming call from the PSTN 107 by the VoIP system 105, and forwarding, by the VoIP system 105, the outgoing call to the at least one of the legacy phone 109 (or 111) and the PBX 201 using the OPG 101.

In some implementations, extending the service of the PSTN 107 may also include routing an incoming call from the VoIP system 105 to the legacy phone 109 (or 111) or the PBX 201. For example, the VoIP system 105 may receive the incoming call from the PSTN 107 (e.g., by an external phone calling a phone number extension associated with the VoIP system 105) and determine that a phone number being called in the incoming call is assigned to the PBX 201. For instance, a PBX 201 and/or telephony device 109 (or 111) may be associated with a user account, phone number extension, or other identifier in a file accessible to the VoIP system 105. The VoIP system 105 may determine the address (e.g., an IP address, SIP address, URL, etc.) of the PBX 201 and/or telephony device 109 (or 111) and may use the determined address to route the incoming call through the OPG 101 to the PBX 201 or the telephony device 109 (or 111) in the organization site 103.

In some instances, additionally or alternatively from the first incoming call received and routed by the VoIP system 105 from the PSTN 107, as described above, the VoIP system 105 may also receive an incoming call from a VoIP telephony device 111 (or 109) and route it to a second VoIP telephony device 111 (or 109) at the organization site 103. For instance, the VoIP system 105 may route both VoIP calls and PSTN calls via the OPG 101 to the telephony device 109 (or 111) at the organization site 103.

In some implementations, the connections from the PBX 201 or the telephony device 109 (or 111) to the PSTN 107 are established via the OPG 101 and the VoIP system 105, as illustrated. For example, while the implementations described in FIGS. 1-3 include a connection between the PSTN 107 and a component in the organization site 103 (e.g., using TDM), this direct connection with the PSTN 107 may be eliminated from the organization site 103 and routed via the VoIP system 105. For instance, the OPG 101 may include a SIP trunk or TDM trunk connecting the VoIP system 105 and/or PSTN 107 with the components at the organization site 103.

Figure 5:
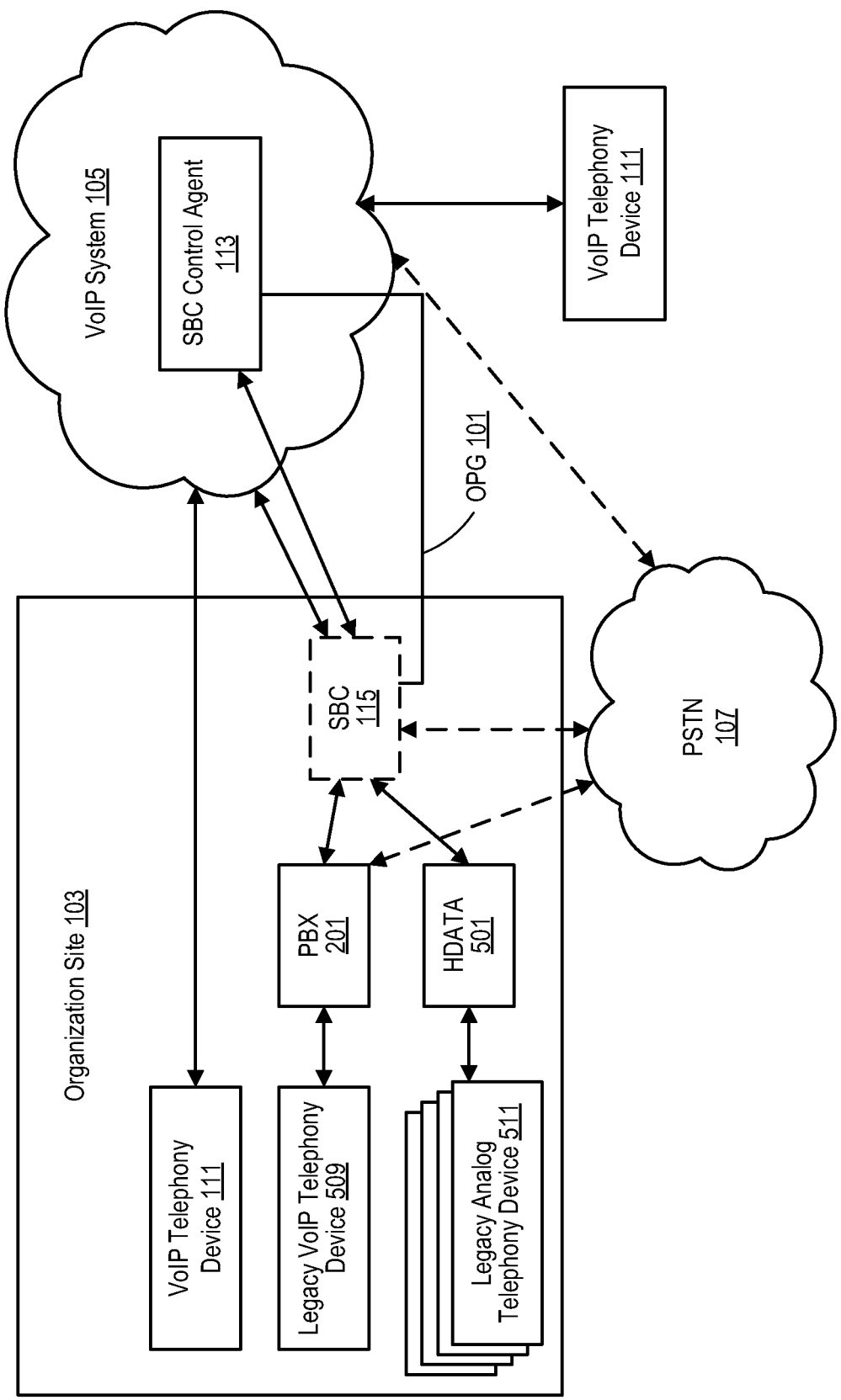
FIG. 5 is a block diagram illustrating a high-density analog telephony adapter deployed at an organization site and interconnecting a VoIP system and one or more of a PSTN, SBC, and/or multiple legacy analog telephony devices, according to some implementations.

FIG. 5 is a block diagram illustrating a high-density analog telephony adapter (HDATA) 501 deployed at an organization site 103 and interconnecting a VoIP system 105 and one or more of a PSTN 107, SBC 115, and/or multiple legacy analog telephony devices 511, according to some implementations. The HDATA 501 may communicate with the SBC 115 and/or VoIP system 105, for example, by TDM or SIP. Communication between the HDATA 501 and the PSTN 107 or VoIP system 105 may be via the OPG 101, SBC 115, or otherwise. In addition to the implementations and functionalities described above, OPGs 101 have many other uses as well. For example, OPGs 101 can be utilized to support interconnection of a VoIP system 105 and legacy analog telephony devices 511 (e.g., campus emergency phones, elevator phones, factory floor phones, etc.).

The VoIP telephony device 111 may be a VoIP telephone, for example, that communicates directly with the VoIP system 105. The legacy VoIP telephony device 509 may be communicatively coupled with the PBX 201, for example, as described in reference to the legacy phone 109 above. The legacy analog telephony device 511 (or legacy analog telephony device 511) may include analog telephones that may be connected to a PSTN 107 or, as described herein, to the HDATA 501. It should be noted that, in some implementations, the PBX 201 and the HDATA 501 may be integrated into a single device that connects both legacy VoIP telephony devices 509 and legacy analog telephony devices 511, as described elsewhere herein.

In some example implementations, the VoIP system 105 (e.g., using the OPG 101) may communicate with the SBC 115, PBX 201, or VoIP telephony devices 111 (or 509), for example, as described in further detail in reference to FIGS. 1-4. Similarly, the HDATA 501 may use some of the operations described above, for example, for communication.

Legacy analog telephony devices 511 may be used by hotels (e.g., guest-room phones), universities (e.g., emergency kiosk phones), or other organizations. These devices may be expensive to replace, so organizations may wish to use these devices with a modern, digital system, such as the VoIP system 105. The system described in reference to FIGS. 5-6, for example, using the HDATA 501 may patch communication of the legacy analog telephony devices 511 through to the VoIP system 105 and/or conventional access to a PSTN 107 with or without a PBX 201 or SBC 115. It should be noted that, although illustrated in FIG. 5 as a separate device, the HDATA 501 may be built into one or more other component(s) at the organization site 103, such as the SPC 115, OPG 101, or the PBX 201.

The HDATA 501 may be a computing device that provides a connection interface, for instance, between an analog network and a SIP network.

The HDATA 501 may include a communication device for performing external communications. For example, the communication device may include an ethernet port for providing a data connection between the HDATA 501 with and VoIP system 105. It should be noted that the communication device may additionally or alternatively include other devices, such as a Wi-Fi or cellular radio for enabling the communication channel with the VoIP system 105.

The HDATA 501 includes a plurality of analog telephone ports, which may include, for example, jacks (e.g., RJ11, etc.) allowing legacy analog telephony devices 511 to be connected to the analog telephone ports, although other implementations are possible. While the PBX 201 may interface with an arbitrary quantity of VoIP phone numbers or extensions (e.g., legacy VoIP phones 509), the quantity of legacy analog telephony devices 511 with which the HDATA 501 interfaces is limited by the fixed quantity of analog telephone ports that the HDATA 501 includes. For instance, depending on the implementation, the HDATA 501 may have 144 or 288 analog ports that can be addressed. Accordingly, the HDATA 501 may open the capability of the OPG 101 to work with analog telephones.

The HDATA 501 may register with the VoIP system 105 as a single device rather than registering individual endpoints (e.g., analog telephone ports), for instance, rather than registering each analog telephone port as a separate analog telephony adapter. For example, depending on the implementation, the HDATA 501 may register its presence or identity with the VoIP system 105 as a single device that represents a plurality of analog devices or may register as a plurality of analog devices. For example, the HDATA 501 may register its address and/or identity with the VoIP system 105.

The VoIP system 105 (e.g., using the SBC control agent 113) may generate a configuration file for the HDATA 501. The configuration file may have a tag extension (e.g., a port number, address, or other configured or pre-configured string, for example) for each of the analog telephone ports of the HDATA 501. The configuration file may include a tag extension associated with each analog telephone port/port number of the HDATA 501. The tag extension may include, for example, a phone number extension, other form of tag, other identifier, or any form of computer-addressable opaque string. In some instances, the VoIP system 105 may use the tag extension to identify a particular analog telephone port, so that it can reference the correct port when communicating with the HDATA 501, for example, via a SIP channel between the VoIP system 105 and the HDATA 501.

In some implementations, the VoIP system 105 may generate and push the configuration file to the HDATA 501. The VoIP system 105 may automatically generate a configuration file based on user inputs, a mapping file, etc. In some implementations, the VoIP system 105 may generate or update a mapping file in which users or user accounts are associated or mapped with the tag extensions, telephone devices, OPGs 101, or other components or attributes. The mapping file may correspond directly to the configuration file or may be used to generate the configuration file that is transmitted to and used by the HDATA 501 to identify analog telephone ports based on the tag extensions.

The HDATA 501 may periodically, or in response to a defined trigger, retrieve a configuration file from the VoIP system 105; although, in some instances, the VoIP system 105 may push or force an update to the configuration file to the HDATA 501.

When an incoming call is received (e.g., via the PSTN 107 or a VoIP telephony device 111) by the VoIP system 105, the VIOP system 105 may determine a tag extension associated with the incoming call (e.g., based on a called phone number, account, etc.) and transmit the tag extension to the HDATA 501, which the HDATA 501 may use to identify an analog telephone port, for example, using string matching.

In some implementations, the VoIP system 105 may generate an online configurator graphical user interface that receives configuration input instructing the server to map one or more tag extensions to one or more analog telephone ports. For example, the VoIP system 105 may be implemented on, included with, or associated with a web server that receives requests and serves data. For instance, the VoIP system 105 may provide the online configurator graphical user interface or data used to generate the interface to a browser or dedicated application on a client computing device communicatively coupled with the VoIP system 105. It should be noted that, although described as an "online" configurator graphical user interface, the interface need not be executed via the Internet or in a web browser, for example, and other implementations are possible and contemplated herein.

Responsive to receiving the configuration input via the online configurator graphical user interface, the VoIP system 105 may map a first tag extension to a first analog telephone port in a mapping file accessible by the VoIP system 105. In some implementations, the mapping file may indicate an association between a configuration input, a user account via which the configuration input was received, a particular legacy analog telephony device 511, a particular analog telephone port, a particular legacy VoIP phone 508, an OPG 101, a component of the system described in FIG. 5, a user account attribute, and/or other data. The VoIP system 105 may automatically generate the configuration file based on the mapping file. For example, in some implementations, the online configurator graphical user interface displays a representation of the HDATA 501, the plurality of analog telephony ports of the HDATA 501, and representations of the plurality of analog telephone devices 511 associated with the plurality of analog telephony ports, with which a user may interact to activate analog ports, associate tag expressions, or perform other operations. For example, the online configurator graphical user interface may be used to assign or unassign tag extensions to users, rooms, analog ports, HDATA 501, PBX 201, SBC 115, organization sites 103, accounts, user roles, etc. The interface may also allow notes or other attributes to be associated with user accounts or tag extensions.

In some implementations, unassigned analog telephone ports may be inactivated, so that no dial tone is played via the unassigned port. The online configurator graphical user interface may receive user input from indicating to map the analog telephone port, which may cause the VoIP system 105 to update/generate a configuration file and transmit it to the HDATA 501 thereby allowing the analog port to be addressed by the VoIP system 105.

In some instances, multiple legacy analog telephony devices 511 and/or other devices (e.g., VoIP telephony devices 111, legacy VoIP telephones 509, etc.) may be associated with a particular user account or telephone number (e.g., a particular extension or phone number). For instance, even if two phones are not on the same network or even at the same location, the VoIP system 105 may cause the devices to ring and/or receive a telephony service or service request. For example, the VoIP system 105 may cause a first analog telephony device (e.g., an analog phone) at a first tag extension and a second analog telephony device at a second tag extension to ring (e.g., simultaneously) based on a telephony service request, determine which of the analog telephony devices are answered, connect the call on the answered analog telephony device, and cease causing the other, unanswered analog telephony device(s) to ring.

It should be noted that, although described as "ringing" for the purposes of this description, a phone does not need to make an audible noise or "ringing" as if with a bell. Ringing, as used herein, may represent a telecommunication signal that causes a telephony device to alert a user of an incoming call or other service, such as issuing an audible, tactile, or visual alert indicating an incoming telephony service. For instance, the telephony device may play a ringtone, vibrate, flash a light, or perform another operation to signal an incoming telephony service.

Similarly, the VoIP system 105 may determine an address of a VoIP telephony device 111 and a legacy analog telephony device 511 and cause both of these devices to ring. For instance, the VoIP system 105 may determine an address of the VoIP telephony device 111 and a tag extension of a legacy analog telephony device 511 coupled with an HDATA 501 and cause both of these phones to ring until one is answered, as described above.

Figure 6:
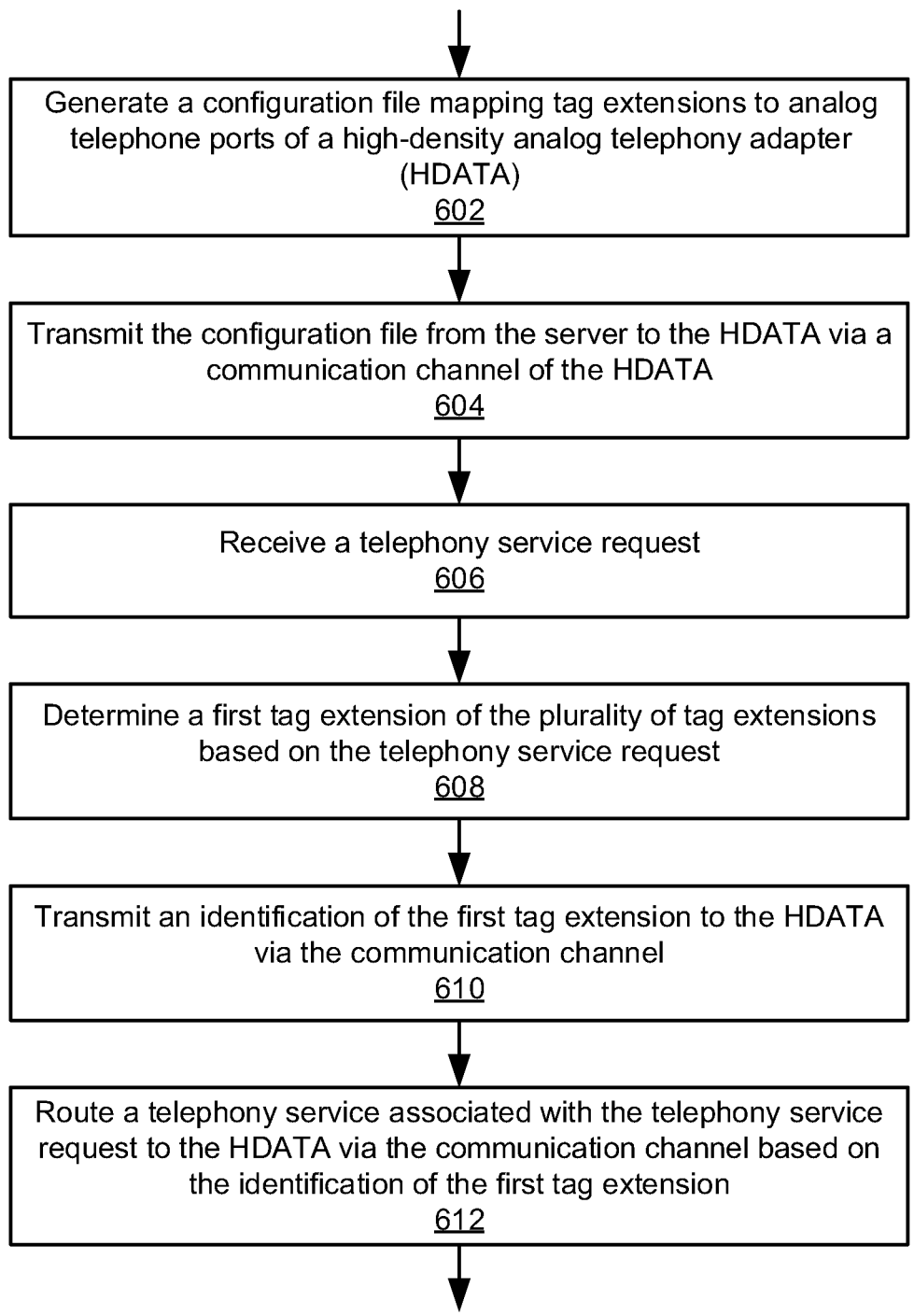
FIG. 6 is a block diagram illustrating an example method for allowing a plurality of legacy analog telephony devices to communicate with a VoIP system.

FIG. 6 is a block diagram illustrating an example method for allowing a plurality of legacy analog telephony devices 511 to communicate with a digital telephony system, such as the VoIP system 105, using SIP or another digital technology. In the described examples, the operations may be performed by the VoIP system 105 (e.g., by a SBC control agent 113 or other component), although other implementations are possible and contemplated herein. Further, as described above, some or all of the operations described in reference to the VoIP system 105, SBC control agent 113, or another component may be distributed, performed by other devices, etc.

In some implementations, at 602, the VoIP system 105 may generate a configuration file mapping tag extensions to analog telephone ports of an HDATA 501. In some instances, the configuration file may map each one of a plurality of tag extensions to one or more of a plurality of analog telephone ports of an HDATA 501. The plurality of analog telephone ports may couple the HDATA 501 to a plurality of analog telephone devices 511. Additionally, the HDATA 501 may be communicatively coupled to a server, such as the VoIP system 105 via a communication channel. The communication channel may be SIP, TDM, or another communication channel and, depending on the implementation, may be routed via the PBX 201, SBC 115, OPG 101, or via a network gateway (e.g., a router, modem, etc.).

The tag extension, as described in further detail above, may be an identification code (e.g., a number, text string, address, etc.) that identifies an analog telephone port. In some instances, the tag extension may also identify or be associated with the HDATA 501.

In some implementations, at 604, the VoIP system 105 may transmit the configuration file from the server to the HDATA 501 via a communication channel of the HDATA 501. For instance, as described above, the HDATA 501 may query the VoIP system 105 for updates or the VoIP system 105 may transmit the update to the HDATA 501. For instance, the VoIP system 105 may transmit the configuration file to the HDATA 501 through a data channel (e.g., via an Internet connection coupled via a wireless or wired data connection). The data channel may be the same channel via which telephony service (e.g., a VoIP, SIP session, etc.) is communicated with the HDATA 501.

In some implementations, at 606, the VoIP system 105 may receive a telephony service request. For example, the VoIP system 105 may receive a phone call from the PSTN 107 or a VoIP telephony device 111. The phone call may identify a user, extension, or phone number associated with the request.

In some implementations, at 608, the VoIP system 105 may determine a first tag extension of the plurality of tag extensions based on the telephony service request, for instance, using a configuration or mapping file.

In some implementations, as discussed above, the user account or incoming phone number may have multiple devices associated therewith, for instance, a user account may have both a tag extension and an address of a VoIP telephone device 111. The VoIP system 105 may route the telephony service to one, both, or neither of these devices, depending on defined user preferences. Similarly, the user account may have multiple of either analog or VoIP devices to which telephony services may be routed. In some instances, the VoIP system 105 may determine a user account associated with the telephony service request and determine one or more tag extensions associated with the user account.

In some implementations, determining the first tag extension may additionally or alternatively comprise determining an address or other identification of the HDATA based on the telephony service request. For instance, the VoIP system 105 may determine an IP address, URL, etc., of the HDATA 501, which may be used to establish a communication channel and/or transmit information (e.g., a tag extension, telephony service request, telephony service, etc.) to the HDATA 501.

In some implementations, at 610, the SBC control agent 113, or other component of the VoIP system 105, may transmit an identification of the first tag extension to the HDATA 501 via the communication channel. The identification of the tag extension may be a file or signal identifying the tag extension, which may be encoded or obfuscated for security, although other implementations are possible. The VoIP system 105 may transmit the identification of the tag extension to the address of the HDATA 501 via the communication channel (e.g., via an Internet connection), as described above.

In some implementations, transmitting the identification of a given tag extension to the HDATA 501 and/or initiating a SIP session with the HDATA 501 via the communication channel may cause the HDATA 501 to route a telephony service to the analog telephone port.

In some implementations, at 612, the VoIP system 105 may route a telephony service associated with the telephony service request to the HDATA 501 via the communication channel based on the identification of the tag extension. The communication channel via which a telephony service request or telephony service is routed may be the same or a different communication channel to that via which the identification of the tag extension is transmitted.

In some implementations, routing the telephony service associated with the telephony service request to the HDATA 501 includes routing the telephony service to the address of the HDATA 501 via an Internet connection, SIP, TDM, VoIP, etc. For example, routing the telephony service to the HDATA 501 may comprise initiating a SIP session with the HDATA 501 via the communication channel. For example, in some implementations, the HDATA 501 may be registered with the server (e.g., the VoIP system 105) as a single SIP device.

In some implementations, the VoIP system 105 may route the telephony service request or telephony service to multiple analog or digital (e.g., VoIP) telephone devices. For example, the VoIP system 105 may route the telephony service to the legacy analog telephony device 511, as described, and may also identify an address of a VoIP telephony device (e.g., 111 or 509) associated with a telephony service request (e.g., with a user account, phone number, etc.) in a mapping file accessible to the VoIP system 105. The VoIP system 105 may route the telephony service associated with the telephony service request to the VoIP telephone device using the identified address of the VoIP telephone device in addition to or alternatively from the legacy analog telephony device 511 via the HDATA 501, for example, based on user preferences defined in the mapping file.

For example, the VoIP system 105 may cause an analog telephone device 511 coupled with the analog telephone port and the VoIP telephony device 111 (or 509) at the address to ring based on the telephony service request. The VoIP system 105 may determine that one of the analog telephone device 511 and the VoIP telephony device 111 have been answered, connect the telephony service with the answered device, and cause the unanswered device to cease ringing.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures, and other aspects are not mandatory, and the mechanisms that implement the invention or its features may have different names, divisions and/or formats. The foregoing description, for purpose of explanation, has been described with reference to specific examples. However, the illustrative discussions above are not intended to be exhaustive or limiting to the precise forms disclosed. Many modifications and variations are possible in view of the above teachings. The examples were chosen and described in order to best explain relevant principles and their practical applications, to thereby enable others skilled in the art to best utilize various examples with or without various modifications as may be suited to the particular use contemplated.

What is claimed is:

1. A computer-implemented method comprising:
    generating, by a processor, a configuration file mapping each one of a plurality of tag extensions to one or more of a plurality of analog telephone ports of a high-density analog telephony adapter (HDATA), the plurality of analog telephone ports coupling the HDATA to a plurality of analog telephone devices, the HDATA being communicatively coupled to a server via a communication channel;
    transmitting, by the processor, the configuration file via the communication channel from the server to the HDATA;
    receiving, by the processor, a telephony service request;
    determining, by the processor, a first tag extension of the plurality of tag extensions based on the telephony service request, the first tag extension being mapped to a first analog telephone port;
    transmitting, by the processor, an identification of the first tag extension to the HDATA; and
    routing, by the processor, a telephony service associated with the telephony service request to the HDATA via the communication channel based on the identification of the first tag extension.

2. The computer-implemented method of claim 1, wherein determining the first tag extension of the plurality of tag extensions based on the telephony service request further comprises:
    determining an account associated with the telephony service request; and
    determining one or more tag extensions associated with the account, the one or more tag extensions comprising at least the first tag extension.

3. The computer-implemented method of claim 2, further comprising:
    identifying, by the processor, an address of a voice over internet protocol (VoIP) telephone device associated with the account; and
    routing, by the processor, the telephony service associated with the telephony service request to the VoIP telephone device using the identified address of the VoIP telephone device.

4. The computer-implemented method of claim 3, further comprising:
    causing, by the processor, a first analog telephone device coupled with the first analog telephone port to ring based on the telephony service request, ringing comprising issuing one or more of an audible, a tactile, and a visual alert indicating an incoming telephony service;
    causing, by the processor, the VoIP telephone device at the address of the VoIP telephone device to ring based on the telephony service request;
    determining, by the processor, that one of the first analog telephone device and the VoIP telephone device have been answered; and
    connecting the telephony service with the one of the first analog telephone device and the VoIP telephone device that was answered.

5. The computer-implemented method of claim 2, wherein:
    the one or more tag extensions associated with the account further comprise the first tag extension and a second tag extension mapped to a second analog telephone port of the plurality of analog telephone ports;
    the method further comprises transmitting an identification of the second tag extension to the HDATA; and
    routing the telephony service associated with the telephony service request to the HDATA via the communication channel further comprises routing the telephony service to the first analog telephone port and the second analog telephone port.

6. The computer-implemented method of claim 1, wherein the first tag extension further comprises a computer-addressable opaque string.

7. The computer-implemented method of claim 1, wherein:
    determining the first tag extension further comprises determining an address of the HDATA based on the telephony service request;
    transmitting the identification of the first tag extension to the HDATA further comprises transmitting the identification of the first tag extension to the address of the HDATA via the communication channel, the communication channel further comprising an Internet connection; and
    routing the telephony service associated with the telephony service request to the HDATA further comprises routing the telephony service to the address of the HDATA via the Internet connection.

8. The computer-implemented method of claim 1, wherein:
    the HDATA is registered with the server as a single session initiated protocol (SIP) device; and
    routing the telephony service associated with the telephony service request to the HDATA via the communication channel further comprises initiating a SIP session with the HDATA via the communication channel.

9. The computer-implemented method of claim 8, wherein initiating the SIP session with the HDATA via the communication channel causes the HDATA to route the telephony service to the first analog telephone port.

10. The computer-implemented method of claim 1, further comprising:
    generating, by the processor, an online configurator graphical user interface that receives configuration input instructing the server to map the first tag extension to the first analog telephone port;
    responsive to receiving the configuration input via the online configurator graphical user interface, mapping, by the processor, the first tag extension to the first analog telephone port in a mapping file accessible by the server, the mapping file indicating an account from which the configuration input was received; and generating, by the processor, the configuration file based on the mapping file.

11. The computer-implemented method of claim 10, wherein the online configurator graphical user interface displays representations of the HDATA, the plurality of analog telephony ports of the HDATA, and the plurality of analog telephone devices associated with the plurality of analog telephony ports.

* * * * *